(12) United States Patent
Fu et al.

(10) Patent No.: US 7,989,241 B2
(45) Date of Patent: Aug. 2, 2011

(54) METHOD FOR MAKING LIQUID CRYSTAL DISPLAY SCREEN

(75) Inventors: Wei-Qi Fu, Beijing (CN); Liang Liu, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 215 days.

(21) Appl. No.: 12/313,414

(22) Filed: Nov. 20, 2008

(65) Prior Publication Data

US 2009/0269684 A1    Oct. 29, 2009

(30) Foreign Application Priority Data

Apr. 23, 2008  (CN) .......................... 2008 1 0066771

(51) Int. Cl.
*H01L 21/00* (2006.01)
(52) U.S. Cl. .............. 438/30; 257/E21.049; 257/E51.04
(58) Field of Classification Search .................... 438/30; 257/E21.049, E51.04
See application file for complete search history.

(56) References Cited

U.S. PATENT DOCUMENTS

| 2004/0053780 A1 | 3/2004 | Jiang et al. |
| 2005/0007648 A1 | 1/2005 | Wu et al. |
| 2006/0113510 A1 | 6/2006 | Luo et al. |
| 2007/0115413 A1 | 5/2007 | Liu et al. |
| 2009/0104832 A1* | 4/2009 | Fu et al. .......................... 445/24 |

FOREIGN PATENT DOCUMENTS

| CN | 1483667 A | 3/2004 |
| CN | 1955819 A | 3/2004 |
| CN | 1979948 | 6/2007 |

OTHER PUBLICATIONS

Fan et al., Explorations on growth mechanism, controlled synthesis and applications of carbon nanotubes, Physics, vol. 35, No. 5, pp. 376-381, (2006).

* cited by examiner

*Primary Examiner* — Quoc D Hoang
(74) *Attorney, Agent, or Firm* — D. Austin Bonderer

(57) ABSTRACT

A method for making a liquid crystal display screen includes the following steps. Firstly, providing a base including a surface. Secondly, forming carbon nanotube structure on the surface of the base to obtain a first electrode plate preform, the carbon nanotubes of each carbon nanotube structure being oriented along the extending direction thereof. Thirdly, forming a fixing layer to cover the carbon nanotube structure, thereby obtaining a first electrode plate. Fourthly, repeating the above-described steps, thereby obtaining a second electrode plate. Lastly, forming a liquid crystal layer between the fixing layers of the first electrode plate and the second electrode plate, the carbon nanotubes of the first electrode plate being perpendicular to that of the second electrode plate, thereby forming the liquid crystal display screen.

20 Claims, 3 Drawing Sheets

METHOD FOR MAKING LIQUID CRYSTAL DISPLAY SCREEN

RELATED APPLICATIONS

This application is related to commonly-assigned applications entitled "LIQUID CRYSTAL DISPLAY SCREEN", filed on Nov. 20, 2008, (application Ser. No. 12/313,452); "LIQUID CRYSTAL DISPLAY SCREEN", filed on Nov. 20, 2008, (application Ser. No. 12/313,394); "METHOD FOR MAKING LIQUID CRYSTAL DISPLAY SCREEN", filed on Nov. 20, 2008, (application Ser. No. 12/313,450); "LIQUID CRYSTAL DISPLAY SCREEN", filed on Nov. 20, 2008, (application Ser. No. 12/313,393); "LIQUID CRYSTAL DISPLAY SCREEN", filed on Nov. 20, 2008, (application Ser. No. 12/313,415); and "LIQUID CRYSTAL DISPLAY SCREEN", filed on Nov. 20, 2008, (application Ser. No. 12/313,440). The disclosures of the above-identified applications are incorporated herein by reference.

BACKGROUND

1. Field of the Invention

The present invention relates to methods for making liquid crystal display screens.

2. Discussion of Related Art

Referring to FIG. 3, a conventional liquid crystal display screen 100 for liquid crystal display (LCD), according to the prior art, generally includes a first electrode plate 104, a second electrode plate 112, and a liquid crystal layer 118. The first electrode plate 104 is located opposite to the second electrode plate 112. The liquid crystal layer 118 is located between the first electrode plate 104 and the second electrode plate 112. A first transparent electrode layer 106 and a first alignment layer 108 are formed in that order on an inner surface of the first electrode plate 104, which faces toward the liquid crystal layer 118. A first polarizer 102 is formed on an outer surface of the first electrode plate 104, which faces away from the liquid crystal layer 118. A second transparent electrode layer 114 and a second alignment layer 116 are formed in order on a surface of the second electrode plate 112, which is near the liquid crystal layer 118. A second polarizer 110 is formed on an outer surface of the second electrode plate 112, which faces away from the liquid crystal layer 118.

The quality and performance of the alignment layers 108, 116 are key factors that determine the display quality of the liquid crystal display screen 100. A high quality liquid crystal display screen demands steady and uniform arrangement of liquid crystal molecules 1182 of the liquid crystal layer 118. This is achieved in part by a correct arrangement of the liquid crystal molecules 1182 at the alignment layers 108, 116. Materials to make the alignment layers 108, 116 are typically selected from the group comprising of polystyrene, ramification of polystyrene, polyimide, polyvinyl alcohol, epoxy resin, polyamine resin, and polysiloxane. The selected materials are used to created a preform of each alignment layer 108, 116. The preform is then treated by one method selected from the group comprising of rubbing, incline evaporating oxide silicon, and atomic beam alignment micro-treatment. Therefore, grooves are formed on the treated surfaces of the preform, and the alignment layer 108, 116 is obtained. The grooves affect the arrangement and orientations of the liquid crystal molecules 118.

In the liquid crystal display screen 100, the liquid crystal molecules 1182 are rod-like. A plurality of parallel first grooves 1082 are formed at an inner surface of the first alignment layer 108. A plurality of parallel second grooves 1162 are formed on an inner surface of the second alignment layer 116. The first grooves 1082 are perpendicular to the second grooves 1162. The grooves 1082, 1162 function so as to align the orientation of the liquid crystal molecules 1182. Particularly, the liquid crystal molecules 1182 adjacent to the alignment layers 108, 116 are aligned parallel to the grooves 1082, 1162 respectively. When the grooves 1082 and 1162 are at right angles and the substrates 104 and 112 are spaced appropriately, the liquid crystal molecules 1182 can automatically twist progressively over 90 degrees from the top of the liquid crystal layer to the bottom of the liquid crystal layer 118.

The alignment layers 108 and 116 can be made using a rubbing method. The rubbing method will be explained in reference to alignment layer 116 as an example of the known method. The manufacturing method for the alignment layers 116 generally includes the following steps: coating a layer of alignment material, such as polyimide, on the inner surface of the second transparent electrode layer 114; and rubbing the surface of the alignment material using rubbing cloth to form the plurality of fine grooves 1162.

However, some drawbacks arise from a mechanical contact of the rubbing cloth with the surface of the alignment material. This method is complicated because a baking process of the polyimide layer is very time-consuming, and the rubbing introduces large electrostatic charges as well as plenty of dust contamination, which in turn requires other facilities and cleansing processes to eliminate. Additionally, the rubbing cloth has a limited lifespan and needs to be replaced frequently.

What is needed, therefore, is to provide a method for making a liquid crystal display screen with a simple fabrication process.

BRIEF DESCRIPTION OF THE DRAWINGS

Many aspects of the present method for making a liquid crystal display screen can be better understood with references to the following drawings. The components in the drawings are not necessarily drawn to scale, the emphasis instead being placed upon clearly illustrating the principles of the present liquid crystal display screen.

Figure 1:
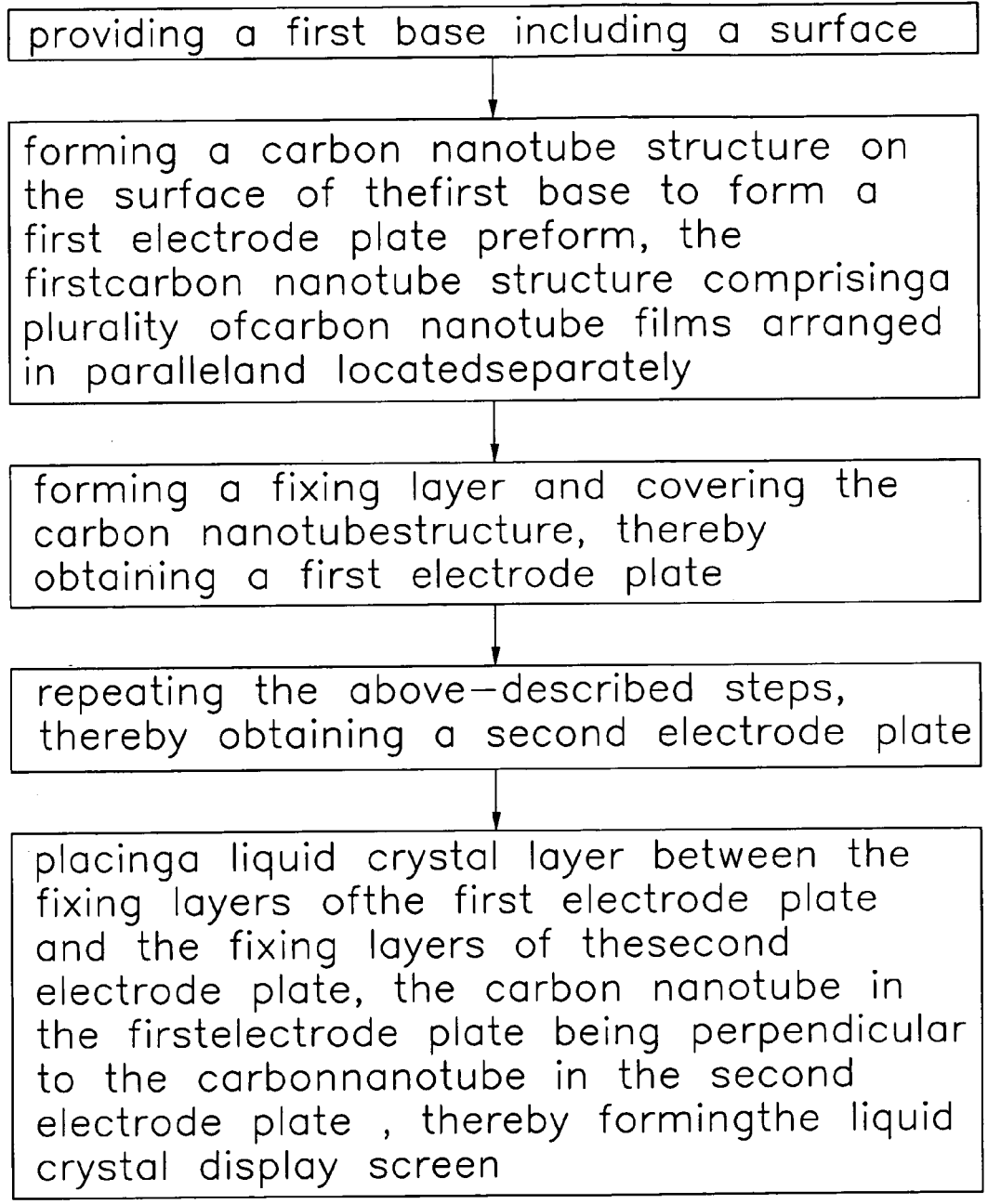
FIG. 1 is a flow chart of a method for making a present liquid crystal display screen, in accordance with a present embodiment.

Corresponding reference characters indicate corresponding parts throughout the several views. The exemplifications set out herein illustrate at least one embodiment of the present method for making the liquid crystal display screen, in at least one form, and such exemplifications are not to be construed as limiting the scope of the invention in any manner.

DETAILED DESCRIPTION OF EXEMPLARY EMBODIMENTS

References will now be made to the drawings to describe, in detail, various embodiments of the present method for making the liquid crystal display screen.

Figure 2:
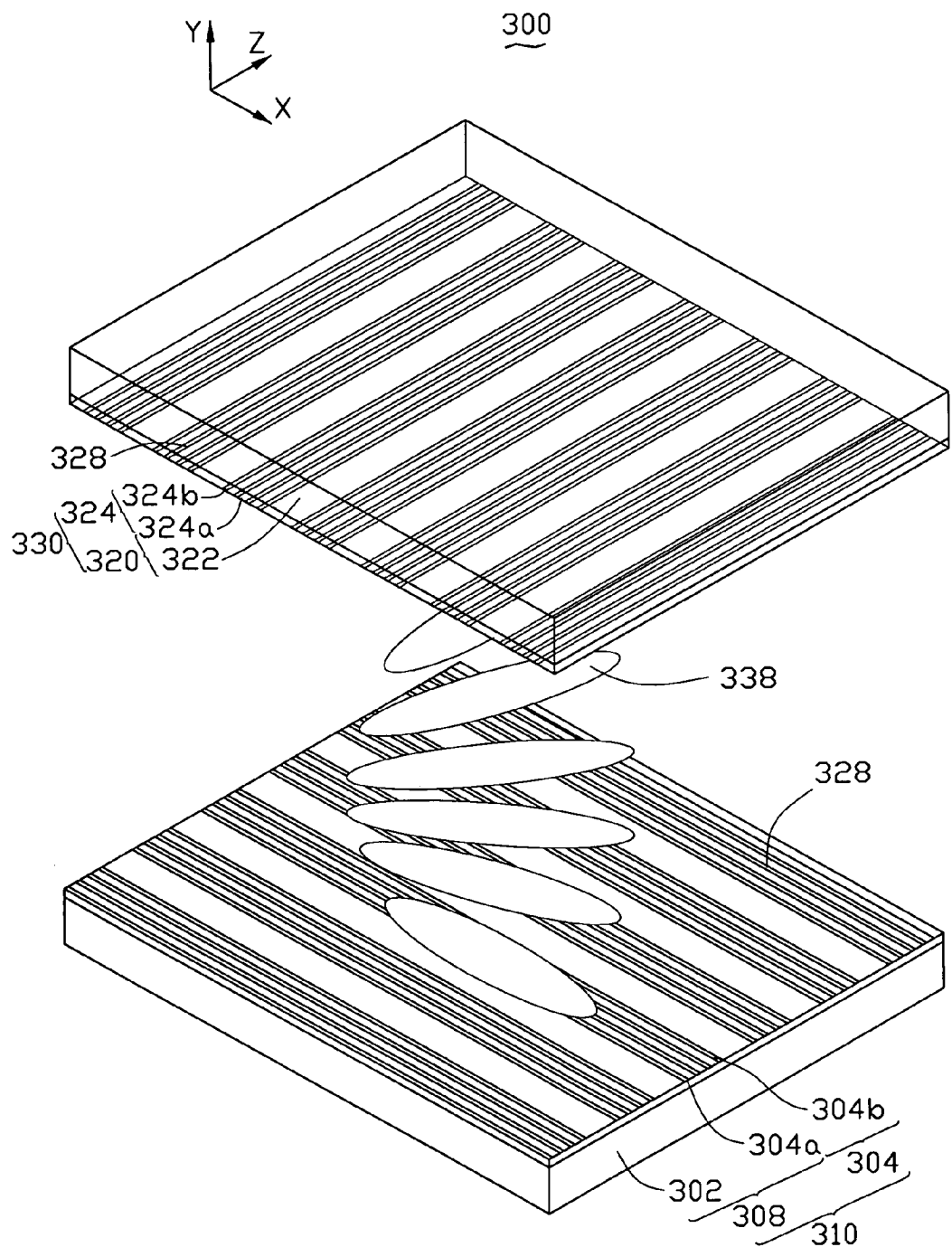
FIG. 2 is a schematic view of the present liquid crystal display screen in accordance with a present embodiment.
Figure 3:
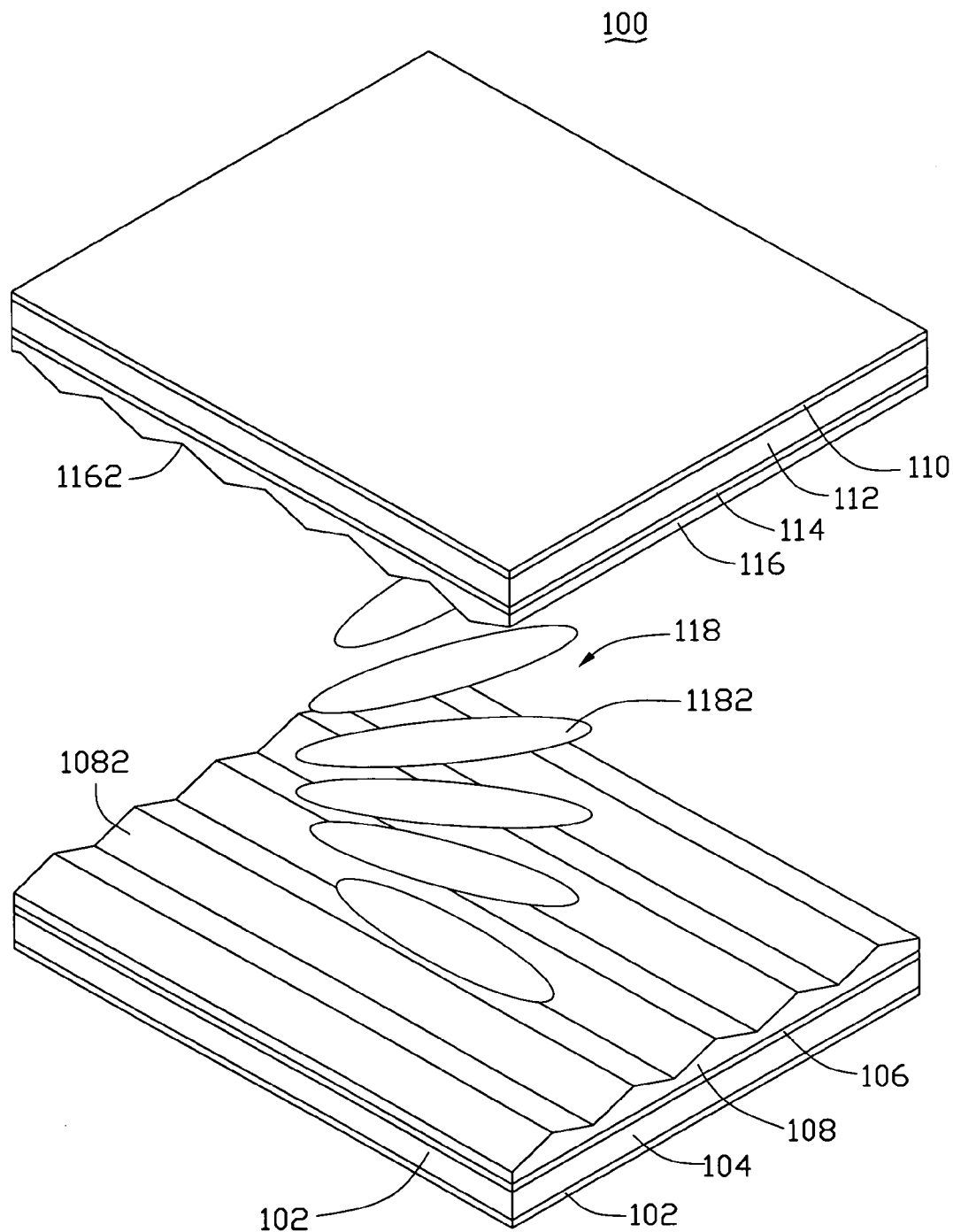
FIG. 3 is a schematic view of a conventional liquid crystal display screen according to the prior art.

Referring to FIGS. 1 and 2, a method for making a liquid crystal display screen 300 includes the following steps: (a) providing a first base 322 including a surface; (b) forming a first carbon nanotube structure 324a on the surface of the first base 322 to form a first electrode plate preform 320, the first carbon nanotube structure 324a including a plurality of carbon nanotube films 328 arranged in parallel and located separately; (c) forming a first fixing layer 324b and covering the first carbon nanotube structure 324a, thereby obtaining a first electrode plate 330; (d) repeating the above-described steps, thereby obtaining a second electrode plate 310; and (e) placing a liquid crystal layer 338 between the fixing layers of the first electrode plate 330 and the fixing layers of the second electrode plate 310, the carbon nanotube in the first electrode plate 330 being perpendicular to the carbon nanotube in the second electrode plate 310, thereby forming the liquid crystal display screen 300.

In step (a), the material of the first base 322 is selected from the group comprising of glass, quartz, diamond, and plastics. The first base 322 can be made of flexible materials, such as cellulose triacetate (CTA). In the present embodiment, the first base 322 is made of CTA. A thickness of the first base 322 is 2 millimeters, a width of the first base 322 is 20 centimeters, and a length of the first base 322 is 30 centimeters.

Moreover, after step (a), a process of cleaning the first base 322 is also included. The process can be carried out by using organic solvents or de-ionized water. Finally, the first base 322 can be dried by protective gases.

Step (b) includes the following substeps: (b1) providing an array of carbon nanotubes, specifically, providing a super-aligned array of carbon nanotubes; (b2) cutting the array of carbon nanotubes to form a plurality of uniformly sub-arrays of carbon nanotubes; (b3) pulling out a plurality of parallel carbon nanotube films 328 from the sub-arrays of carbon nanotubes by using a pulling tool (e.g., adhesive tape, pliers, tweezers, or another tool allowing multiple carbon nanotubes to be gripped and pulled simultaneously); and (b4) placing a plurality of parallel carbon nanotube films 328 on the surface of the first base 322 to form the first electrode plate preform 320.

In step (b1), the super-aligned array of carbon nanotubes can be formed by the following substeps: (b11) providing a substantially flat and smooth substrate; (b12) forming a catalyst layer on the substrate; (b13) annealing the substrate with the catalyst at 700 to 900° C. in atmosphere such as air for 30 to 90 minutes; (b14) heating the substrate with the catalyst up to a range of 500 to 740° C. in a furnace in protective gas; (b15) supplying a carbon source gas into the furnace for 5 to 30 minutes and growing a super-aligned array of the carbon nanotubes from the substrate.

In step (b11) the substrate can be a P-type silicon wafer, an N-type silicon wafer, or a silicon wafer with a film of silicon oxide thereon. In the present embodiment, a 4 inches P-type silicon wafer is used as the substrate.

In step (b12) the catalyst can be made of iron (Fe), cobalt (Co), nickel (Ni), or any combination alloy thereof.

In step (b14) the protective gas can be a nitrogen ($N_2$) gas, ammonia ($NH_3$) gas or a noble gas. In step (b15) the carbon source gas can be a hydrocarbon gas such as ethylene ($C_2H_4$), methane ($CH_4$), acetylene ($C_2H_2$), ethane ($C_2H_6$) or any combination thereof.

The super-aligned array of carbon nanotubes means an array of carbon nanotubes including a plurality of carbon nanotubes being parallel to each other and substantially perpendicular to the surface of the substrate. In the present embodiment, the super-aligned array of carbon nanotubes can be approximately 200 to 900 micrometers in height. The super-aligned array of carbon formed under the above conditions is essentially free of impurities such as carbonaceous or residual catalyst particles. The carbon nanotubes in the super-aligned array are packed together closely by van der Waals attractive force. The super-aligned array proves to be an advantageous medium to produce carbon nanotube films.

In the present embodiment, the super-aligned array of carbon nanotubes is fabricated by chemical vapor deposition method. The super-aligned array of carbon nanotubes includes a plurality of carbon nanotubes parallel to each other and more or less perpendicular to the substrate. The carbon nanotubes in the array can be single-walled carbon nanotubes, double-walled carbon nanotubes, or multi-walled carbon nanotubes. Diameters of the single-walled carbon nanotubes approximately range from 0.5 to 10 nanometers. Diameters of the double-walled carbon nanotubes approximately range from 1 to 50 nanometers. Diameters of the multi-walled carbon nanotubes approximately range from 1.5 to 50 nanometers.

The array of carbon nanotubes related in step (b1) is not limited to the above-described method. Alternatively, methods such as the graphite electrode constant current arc discharge deposition method and the laser evaporation deposition method can also be used to fabricate the array of carbon nanotubes.

In step (b2), a plurality of uniformly and separately located sub-arrays of carbon nanotubes are obtained after cutting the array of carbon nanotubes. The distance between adjacent sub-arrays of carbon nanotubes approximately ranges from 10 micrometers to 200 micrometers.

Methods of cutting the array of carbon nanotubes include laser beam scan cutting or electron beam scan cutting. The cutting process is undertaken in an atmosphere or an oxygenous environment. In the present embodiment, the laser beam scan cutting method is applied to cut the array of carbon nanotubes. The width of the laser beam approximately ranges from 10 micrometers to 200 micrometers, the power of the laser beam approximately ranges from 10 watts to 50 watts, and the velocity of the laser beam scan approximately ranges from 10 to 1000 millimeters per minute.

In step (b3), a method of pulling out a plurality of parallel carbon nanotube films 328 by using a tool includes the following substeps: (b31) selecting a plurality of carbon nanotube segments of a predetermined width from each sub-array of carbon nanotubes; and (b32) pulling the carbon nanotube segments at an even/uniform speed to achieve a plurality of parallel carbon nanotube films 328.

The carbon nanotube segments having a predetermined width can be selected by using a pulling tool, such as adhesive tapes, pliers, tweezers, or other tools allowing multiple carbon nanotubes to be gripped and pulled simultaneously to come in contact with the super-aligned array. The pulling direction is substantially perpendicular to the growing direction of the super-aligned array of carbon nanotubes and parallel to the cutting direction.

More specifically, during the pulling process of each sub-array of carbon nanotubes, as the initial carbon nanotube segments are drawn out, other carbon nanotube segments are also drawn out end-to-end due to the van der Waals attractive force between ends of adjacent segments. This process of drawing ensures that a continuous, uniform a plurality of parallel carbon nanotube films 328 can be formed. The extending direction of the carbon nanotubes in each carbon nanotube films 328 is parallel to the pulling direction. The pulling/drawing method is simple, fast, and suitable for industrial applications.

After step (b3), a plurality of parallel carbon nanotube films can be placed separately or overlapped on the surface of the first base 322 along a same direction to form first carbon nanotube structure 324a. The distance between adjacent first carbon nanotube structures 324a approximately ranges from 10 to 250 micrometers.

Due to a plurality of parallel carbon nanotube films 328 being sticky in the some embodiments, a plurality of parallel carbon nanotube films 328 can be directly adhered to the first base 322. In other embodiments the attachment of a plurality of parallel carbon nanotube films 328 to the first base 322, includes a step of forming an adhesive layer on the first base 322 is further included after the first base 322 has been dried. A plurality of parallel carbon nanotube films 328 can be fixed on the first base 322 via an adhesive agent or transparent conductive glue. In the present embodiment, a plurality of parallel carbon nanotube films 328 can be fixed on the first base 322 via alcohol.

Each carbon nanotube film 328 includes a plurality of carbon nanotube joined end-to-end and attracted by van der Walls attractive force therebetween. Thus, a number of uniformly distributed and parallel gaps are defined between carbon nanotubes. Therefore, the gaps are used as microgrooves that align the molecules of liquid crystal.

Furthermore, a step (b5) of treating the first carbon nanotube structure 324a with an organic solvent is carried out after the step (b4). In step (b5), the first carbon nanotube structure 324a on the surface of the first base 322 is soaked in an organic solvent. The organic solvent may be a volatilizable organic solvent, such as ethanol, methanol, acetone, dichloroethane, chloroform, and any combination thereof. The organic solvent is ethanol in the present embodiment. This process can be performed through applying some organic solvent onto the surface of the first carbon nanotube structure 324a or dipping the first carbon nanotube structure 324a into the organic solvent. After being soaked by the organic solvent, microscopically, carbon nanotube strings will be formed by some adjacent carbon nanotubes bundling together, due to the surface tension of the organic solvent. In one aspect, due to the decrease of the specific surface area via bundling, the mechanical strength and toughness of the first carbon nanotube structure 324a are increased and the coefficient of friction of the first carbon nanotube structure 324a is reduced.

In step (c), the first fixing layer 324b is formed on the first carbon nanotube structure 324a, thus forming a first alignment layer 324. When the materials of the first fixing layer 324b are selected from the group comprising of diamonds, silicon nitrogen, hydride of random silicon, silicon carbon, silicon dioxide, aluminium oxide, tin oxide, cerium oxide, zinc titanate, and indium titanate, the first fixing layer 324b is fabricated by means of evaporating, sputtering, and plasma enhanced chemical vapor deposition. When the materials of the first fixing layer 324a are selected from polyethylene ethanol, polyamide, polymethyl methacrylate, and polycarbonate, the first fixing layer 324b is sprayed on the first carbon nanotube structure 324a. A thickness of the first fixing layer 324b approximately ranges from 10 nanometers to 2 micrometers.

In the present embodiment, the first fixing layer 324b is made of organic materials. The method includes the following steps: (c1) dissolving powder of an organic material into a solvent to form a solution; (c2) dipping the solution on the first carbon nanotube structure 324a and spinning the first carbon nanotube structure 324a in a spinning machine; and (c3) heating the first carbon nanotube structure 324a to form the first fixing layer 324b on the first carbon nanotube structure 324a.

In step (c1), the organic material is polyimide (PI). The solvent is a volatile organic solvent. The concentration of the solution ranges from 1% to 10%. In the present embodiment, the solvent is γ-butyrolactone. The concentration of the PI solution is 5%.

In step (c2), the amount of PI solution dipped on the first carbon nanotube structure 324a determines the thickness of the first fixing layer 324b. Generally, the thickness of the first fixing layer 324b ranges from 10 nanometers to 2 micrometers. The spinning rate ranges from 1000 to 8000 rotations per minute (r/min). In the present embodiment, the spinning rate is 5000 r/min and the spinning time is 60 seconds. As a result, the thickness of the first fixing layer 324b is 80 nanometers.

In step (c3), the heating treatment is used to remove the residual solvent and to dry the first carbon nanotube structure 324a. In the present embodiment, the heating temperature is 250° C. and the heating time is 60 seconds. The heating temperature and the heating time are selected according to user-specific needs.

Due to the carbon nanotube films 328 in the first carbon nanotube structure 324a having gaps between adjacent carbon nanotubes, when the first fixing layer 324b is covered on the first carbon nanotube structure 324a, a plurality of parallel first grooves (not shown) are formed on the first fixing layer 324b to align the molecules of liquid crystal. The first alignment layer 324 includes the first carbon nanotube structure 324a and the first fixing layer 324b. Because the first fixing layer 324b can prevent the first carbon nanotube structure 324a from being saturated, the first alignment layer 324 is not removed when the first alignment layer 324 comes in contact with the liquid crystal molecules or atmosphere for a long period of time. Thus, the present alignment layer has a good alignment quality if used in the liquid crystal screen.

In step (d), the second electrode plate 310 includes a second carbon nanotube structure 304a, a second fixing layer 304b and a second base 302. The second carbon nanotube structure 304a is formed on a surface of the second base 302 to form a second electrode plate preform 308. The second fixing layer 304b is formed on the second carbon nanotube structure 304a, thus forming a second alignment layer 304. The structure of the second electrode plate 310 is similar to that of the first electrode plate 330. From the description of the first fixing layer 324b, a plurality of second grooves (not shown) are also formed on the second Fixing layer 304b to align the liquid crystal molecules.

In step (e), the liquid crystal material is dipped into the first electrode plate 330 and the second electrode plate 310 via a tube, and as a result, a liquid crystal layer 338 is formed therebetween. The liquid crystal layer 338 includes a plurality of rod-like liquid crystal molecules. In the present embodiment, the first fixing layer 304a and the second fixing layer 324b are adjacent to the liquid crystal layer 338 disposed to form the liquid crystal screen 300. Specifically, the first grooves are placed along the X-axis and the second grooves are placed along the Z-axis. Furthermore, the circumference between the first electrode plate 330 and the second electrode plate 310 is sealed by silicon sulfide rubber 706B seal glue. It takes one day for the seal glue to solidify after spreading the seal glue on the edge of the first electrode plate 330 and the second electrode plate 310.

A step of connecting an electrode leading wire to each carbon nanotube structure is needed before sealing the first electrode plate 330 and the second electrode plate 310. The electrode leading wire is used to apply a voltage to the liquid crystal display screen 300.

In order to maintain enough spacing between the first electrode plate 330 and the second electrode plate 310, a plurality of spacers (not shown) are placed between them. The size and the material of the spacer can be selected based on user-specific needs. In the present embodiment, a plurality of polyethylene (PE) balls are dispersed in the ethanol, and the solution containing the PE balls are put into the first electrode plate 330 and the second electrode plate 310. After the ethanol has evaporated, the PE balls between the first electrode plate 330 and the second electrode plate 310 are used as spacers. The diameter of the PE balls ranges from 1 to 10 micrometers.

Because the carbon nanotubes in the carbon nanotube layer are arranged in parallel, the carbon nanotube layer has a polarization to light, and as a result, can be used to replace the conventional polarizer. In order to obtain a better effect of polarization, at least one polarizer is placed on the first electrode plate 330 and the second electrode plate 310, and faces away from the liquid crystal layer 338.

The extending direction of the first carbon nanotube structure 324a is perpendicular to the extending direction of the second carbon nanotube structure 304a. Therefore, the crossed area of the first carbon nanotube structure 324a and the second carbon nanotube structure 304a in the space defines a pixel. Due to the first alignment layer 324 and the second alignment layer 304 including a number of first carbon nanotube structure 324a and second carbon nanotube structure 304a, respectively, a plurality of pixels is formed in the liquid crystal display screen 300.

The present method for making the liquid crystal display screen 300 has many advantages. Specifically, due to gaps existing within the carbon nanotube structure, the fixing layer covered on the carbon nanotube structure also directly forms a plurality of grooves. Therefore, an additional process for forming grooves is not needed, thereby reducing the fabricating cost and simplifying the production process. Furthermore, by overlapping a fixing layer on the carbon nanotube structure, this ensures that the carbon nanotube structure of the alignment layer does not fall off when it comes in contact with the liquid crystal layer.

Finally, it is to be understood that the above-described embodiments are intended to illustrate, rather than limit, the invention. Variations may be made to the embodiments without departing from the spirit of the invention as claimed. The above-described embodiments illustrate the scope of the invention but do not restrict the scope of the invention.

It is also to be understood that above description and the claims drawn to a method may include some indication in reference to certain steps. However, the indication used is only to be viewed for identification purposes and not as a suggestion as to an order for the steps.

What is claimed is:

1. A method for making liquid crystal display screen, the method comprising the following steps:
   (a) providing a base comprising a surface;
   (b) forming a carbon nanotube structure on the surface of the base to form a first electrode plate preform, the carbon nanotube structure comprising a plurality of carbon nanotube films arranged in parallel and spaced from each other;
   (c) applying a fixing layer that covers the carbon nanotube structure, thereby obtaining a first electrode plate;
   (d) repeating the above-described steps, thereby obtaining a second electrode plate; and
   (e) placing a liquid crystal layer between the fixing layer of the first electrode plate and the fixing layer of the second electrode plate, the carbon nanotubes in the first electrode plate being perpendicular to the carbon nanotubes in the second electrode plate.

2. The method as claimed in claim 1, wherein in step (b), forming the carbon nanotube structure on the surface of the base comprises the following substeps:
   (b1) providing an array of carbon nanotubes;
   (b2) cutting the array of carbon nanotubes to form a plurality of uniformly uniform sub-arrays of carbon nanotubes;
   (b3) pulling out a plurality of parallel carbon nanotube films from the plurality of uniform sub-arrays of carbon nanotubes; and
   (b4) placing the plurality of parallel carbon nanotube films on the surface of the base.

3. The method as claimed in claim 2, wherein a distance between adjacent sub-arrays of carbon nanotubes approximately ranges from 10 micrometers to 200 micrometers.

4. The method as claimed in claim 2, wherein cutting the array of carbon nanotubes is performed by one method of laser beam scans cutting and electron beam scans cutting.

5. The method as claimed in claim 4, wherein a width of the laser beam approximately ranges from 10 micrometers to 200 micrometers, a power of the laser beam approximately ranges from 10 watts to 50 watts, and a velocity of the laser beam scan approximately ranges from 10 millimeters per minutes to 1000 millimeters per minute.

6. The method as claimed in claim 2, wherein in step (b4), the plurality of parallel carbon nanotube films are placed separately, a distance between adjacent carbon nanotube films approximately ranges from 10 micrometers to 250 micrometers.

7. The method as claimed in claim 1, wherein step (a) further comprising cleaning the base, and cleaning the base is carried out by using solvents selected from the group consisting of organic solvents and de-ionized water.

8. The method as claimed in claim 7, wherein after cleaning the base, a step of forming an adhesive layer on the base is further provided, and the carbon nanotube structure are formed on the adhesive layer.

9. The method as claimed in claim 1, wherein step (b) further comprising step of treating the carbon nanotube structure with an organic solvent.

10. The method as claimed in claim 1, wherein materials of the fixing layer are selected from the group consisting of diamond, silicon nitrogen, hydride of random silicon, silicon carbon, silicon dioxide, aluminium oxide, tin oxide, cerium oxide, zinc titanate, and indium titanate.

11. The method as claimed in claim 10, wherein the fixing layer is fabricated by one method of evaporating, spraying, and plasma enhanced chemical vapor deposition.

12. The method as claimed in claim 1, wherein materials of the fixing layer are selected from the group consisting of polyethylene ethanol, polyamide, polymethyl methacrylate, and polycarbonate.

13. The method as claimed in claim 12, wherein the fixing layer is fabricated by the following substeps:
   (c1) dissolving powder of an organic material into a solvent to form a solution;
   (c2) dipping the solution on the carbon nanotube structure and spinning the carbon nanotube structure in a spinning machine; and
   (c3) heating the carbon nanotube structure to form the fixing layer on the carbon nanotube structure.

14. The method as claimed in claim 1, wherein a thickness of the fixing layer approximately ranges from 10 nanometers to 2 micrometers.

15. The method as claimed in claim 1, wherein in step (e), forming the liquid crystal layer is performed by applying a liquid crystal material on the fixing layer of the second electrode plate and then covering the fixing layer of the first electrode plate on the liquid crystal material.

16. The method as claimed in claim 15, wherein before the liquid crystal material is applied on the fixing layer of the second electrode plate, a process of dipping a plurality of transparent spacers on the fixing layer of the second electrode plate is further provided.

17. The method as claimed in claim 16, wherein the process of disposing the plurality of transparent spacers comprises the following substeps: dispersing a plurality of polyethylene balls in ethanol to form a solution; dipping the solution on the fixing layer of the second electrode plate; and evaporating the ethanol.

18. The method as claimed in claim 1, wherein step (e) further comprising sealing the first electrode plate and the second electrode plate by seal glue.

19. A method for making liquid crystal display screen, the method comprising the following steps:
 (a) providing a base having a surface;
 (b) providing an array of carbon nanotubes;
 (c) cutting the array of carbon nanotubes to form a plurality of sub-arrays of carbon nanotubes;
 (d) pulling out a plurality of carbon nanotube films from the plurality of sub-arrays of carbon nanotubes;
 (e) placing the plurality of carbon nanotube films on the surface of the base such that the plurality of carbon nanotube films are parallel and spaced apart from each other;
 (f) applying a fixing layer to cover the plurality of carbon nanotube films, thereby obtaining a first electrode plate;
 (g) repeating steps (a) though (f), thereby obtaining a second electrode plate; and
 (h) placing a liquid crystal layer between the fixing layer of the first electrode plate and the fixing layer of the second electrode plate, carbon nanotubes in the first electrode plate being perpendicular to carbon nanotubes in the second electrode plate.

20. The method as claimed in claim 19, wherein step (c) further comprises uniformly cutting the array of carbon nanotubes.

* * * * *